United States Patent [19]

Reilly

[11] Patent Number: 4,803,785
[45] Date of Patent: Feb. 14, 1989

[54] WHEEL ALIGNMENT APPARATUS

[75] Inventor: Bruce J. Reilly, Narellan, Australia

[73] Assignee: Joyce Lynette Reilly, Narellan, Australia

[21] Appl. No.: 1,025

[22] Filed: Jan. 7, 1987

[30] Foreign Application Priority Data

Jan. 17, 1986 [AU] Australia .............................. PH4245

[51] Int. Cl.⁴ .............................................. G01B 5/255
[52] U.S. Cl. ..................................... 33/288; 33/203.18
[58] Field of Search ...................... 33/288, 337, 203.8, 33/203.2, 203.21

[56] References Cited

U.S. PATENT DOCUMENTS

| 2,882,608 | 4/1959 | Tursman | 33/288 |
| 3,782,831 | 1/1974 | Senften | 33/288 X |
| 4,432,145 | 2/1984 | Caroff | 33/203.18 X |
| 4,440,495 | 4/1984 | Bergstrom et al. | 33/288 |
| 4,569,140 | 2/1986 | Hobson | 33/203.18 |
| 4,594,789 | 6/1986 | Marino et al. | 33/288 |

OTHER PUBLICATIONS

Bear Model 205-T Projectoe—Operating Instructions Applied Power, Inc., Bear, The Wheel Service Divison, Automotive Service Systems Group, Rock Island, Ill. 61201.
Josam Products, Sweden—Instructions Josam Laser Am—Excerpts—Josam lastbilteknik ab, Oerebro, Sweden.

Primary Examiner—William D. Martin, Jr.
Attorney, Agent, or Firm—Holman & Stern

[57] ABSTRACT

The invention relates to the alignment of motor vehicle wheels and axles. A first embodiment is disclosed for an apparatus comprising a means to hook over an adjustable mounting shaft on a steer wheel providing at least partial rotation thereof, a transverse suspension member attached to the hanger with a light source retained in a bracket and rotatably mounted on a non adjustable mounting shaft at one end thereof and a counterweight at the other. The connections of the hook means and the light source bracket to their respective mounting shafts are such that the mounting shaft is held between a clamping means and two points on each side of the hook means and light source bracket respectively. The clamping means disclosed is a threaded member with a spring loaded ball in one end which engages a circumferential groove on the respective mounting shaft. The second embodiment substantially comprises the light source bracket of the first embodiment adapted for mounting directly onto a directionally adjustable mounting shaft attached to a non-steering wheel of a motor vehicle. Preferred embodiments use laser light sources and include a calibration means to vary the orientation of said light source.

12 Claims, 4 Drawing Sheets

WHEEL ALIGNMENT APPARATUS

BACKGROUND OF THE INVENTION

1. Field of the Invention

The present invention relates apparatus and device for alignment of wheels and axles vehicles, particularly trucks but also of trailers, buses and four wheel drive vehicles.

2. Description of the Prior Art

In the alignment of steer wheels of trucks and other vehicles it is known to attach a clamp to the rim of a steer wheel of a vehicle to be examined, said clamp having mounted thereon a short, directionally adjustable shaft which is directionally adjusted to be either parallel to or coincidental with the axis of rotation of the wheel under examination. Thereafter a light source is suspended from the shaft in association with a counterbalance device such that an image of a calibrated scale can be projected across the front of the vehicles; the image is then focused onto a flat surface on the far side of the vehicle.

Based on the position of the projected image on the flat surface on the far side of the vehicle, it is possible to calculate the alignment of the steer wheel under examination.

It is also known, in the investigation of rear axles of vehicles, to attach a directionally adjustable shaft to a non-steer wheel in the manner described above and to mount an axially rotatably light source thereon such that a light beam can be projected in any direction at right angles to the shaft. The light beam is projected onto a calibrated scale at the front of the vehicle, rotated through approximately 180°, then projected onto a scale at the rear of the vehicle. Based on a comparison of the points illuminated on the front and rear scales, the orientation of the axle, relative to the longitudinal center-line of the vehicle, can be calculated.

It is a requirement of such devices that they be adapted to be readily mountable and demountable from the vehicle under examination. The prior art devices have been found to be deficient in that when they are mounted on the directionally adjustable shaft, the interaction between the shaft and mounting means is such that the prior art devices are subject to slight variations in orientation from installation to installation. Consequently, in order that the light beam can be correctly projected and reliably interpreted, the prior art devices require calibration before each wheel is examined. Furthermore, as the devices need to be at least partially rotated during use, small movements occasionally occur in the connection means by which the light sources of the prior art devices are suspended. Thus, the prior art devices sometimes require recalibration during a wheel alignment examination.

BRIEF SUMMARY OF THE INVENTION

The object of the present invention is to provide devices with which light sources can be readily mounted and demounted from vehicle wheels on which there has been attached a directionally adjustable shaft such that wheel alignment examinations can be carried out with a minimal requirement for calibration. The present invention also provides a device for the investigation of wheel alignments which can be at least partially rotated on a shaft with a minimal risk of the need for recalibration during use.

According to the present invention there is disclosed a wheel or axle alignment apparatus comprising means to connect at least one part of the apparatus to an elongate shaft such that the elongate shaft is clamped in a triangulated manner between a clamping means and two pairs of supporting points on the apparatus.

In one preferred embodiment of the present invention there is provided a wheel or axle alignment apparatus comprising:

a hanger means adapted to hook over a directionally adjustable mounting shaft, the axis of said shaft being adapted to be set either parallel to or coincident with the axis of rotation of a wheel of a vehicle;

a transverse suspension member, rigidly connected to the bottom of said hanger means, having a non-adjustable mounting shaft at one end;

a bracket adapted to hold a light source, said bracket being at least partially rotatable on said non-adjustable mounting shaft such that a beam of light from a light source when held in the bracket is projectable at approximately right angles to said transverse suspension member;

calibration means to allow adjustment to said light source to ensure that the light beam can be projected in a vertical plane to which said directionally adjustable mounting shaft is parallel;

wherein the connection between said hanger means and said directionally adjustable mounting shaft and/or the connection means between said light source bracket and said non-adjustable mounting shaft comprises, a mounting unit including two parallel side plates separated by at least one transverse separating member, said parallel side plates each having identical recesses adapted to receive a mounting shaft, said clamping means being adapted to contact said mounting shaft at right angles and to clamp said mounting shaft in said triangulated manner between said clamping means and two points on each of said parallel side plates within said respective recesses.

In another preferred embodiment of the present invention there is provided a device for investigating the alignment of rear axles of a vehicle comprising:

a light source retained in a bracket, said bracket being rotatably mountable on a directionally adjustable mounting shaft, said shaft being adapted to be set either parallel to or coincidental with the axis of rotation of a wheel of a vehicle;

calibration means to allow adjustment of said light source to ensure that a light beam from said light source can be projected at right angles to said directionally adjustable mounting shaft;

wherein the connection means between said light source bracket and said directionally adjustable mounting shaft comprises;

a mounting unit including two parallel side plates separated by at least one transverse separating member, said parallel side plates each having identical recesses adapted to receive a mounting shaft, and a clamping means adapted to contact said directional adjustable mounting shaft at right angles and to clamp said directionally adjustable mounting shaft in said triangulated manner between said clamping means and two points of each of said side plates within said respective recesses.

A further improvement is provided by machining a circumferential groove in the mounting shaft to receive the clamping means. This ensures that the mounting unit is seated in precisely the same position on the mounting shaft each time the device is mounted and prevents longitudinal movement along the shaft during rotation of the mounting unit on said shaft.

A still further improvement is provided by threadedly engaging the clamping means in the transverse plate fixed between side plates of the mounting unit and providing a spring loaded ball in one end of the clamping means to engage a circumferential groove in the mounting shaft. This allows a predetermined force to be applied to the mounting shaft sufficient to prevent the apparatus from rotating in normal circumstances yet allowing same to be rotated for final adjustment by the application of a torque without the need to release the clamping means and without causing wear on the mounting shaft.

Still further improvement is provided by using laser light sources to project the light beams as required. Light projected from a laser source allows a greater degree of accuracy in use of a device due to the well known characteristics of lasers wherein a beam does not diffuse readily as does conventional light. Laser sources provide a further benefit in that heat generation is minimized. Also a laser can be used in full sunlight without difficulty as opposed to conventional light beams.

The present invention will now be described by way of example with reference to the accompanying drawings which FIG. 1 is a dramatic perspective view showing an embodiment of the present invention as used to investigate the alignment of steer wheels;

DETAILED DESCRIPTION

Figure 1:
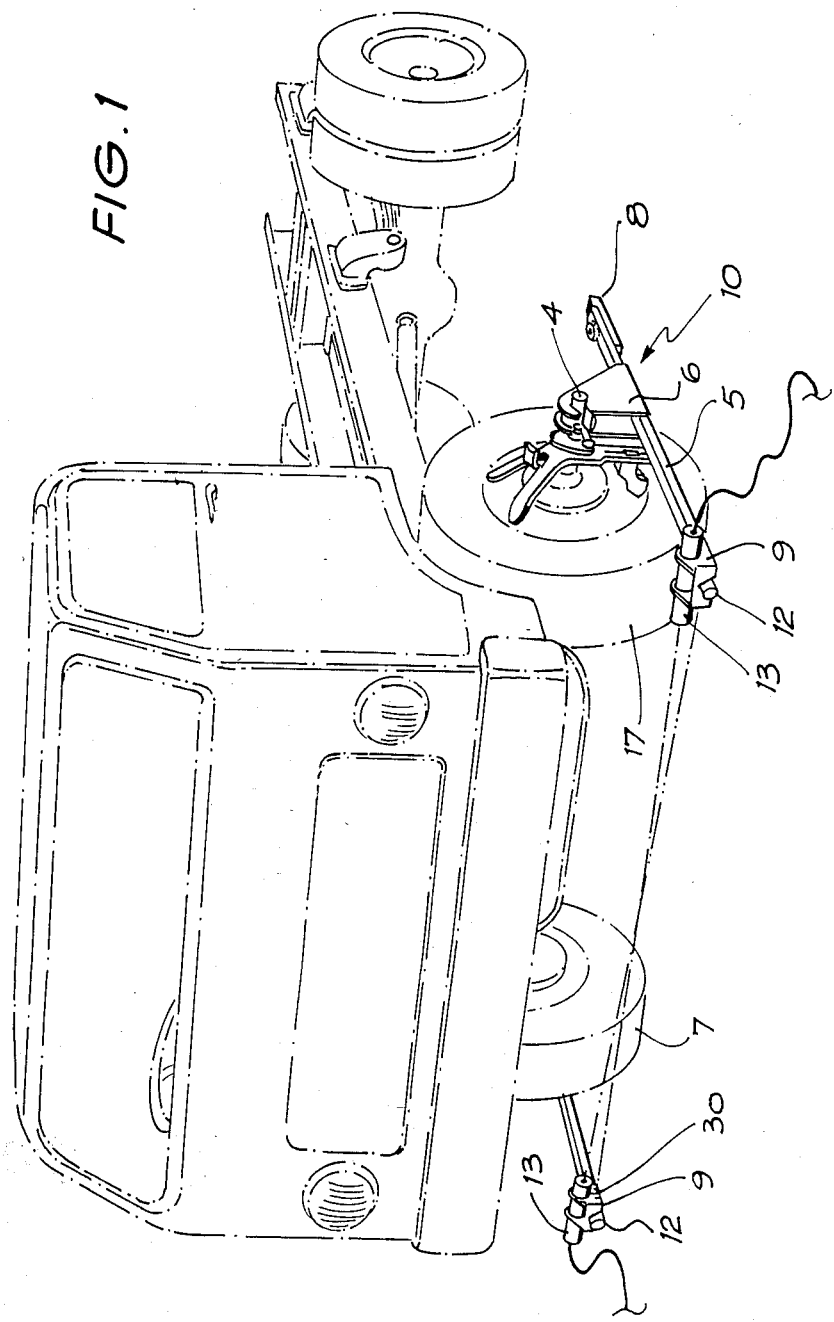

FIG. 1 shows a first preferred embodiment of the present invention that is used to investigate the alignment of a steer wheel 7 of a motor vehicle. In this preferred embodiment of the present invention a directionally adjustable mounting shaft 4 is attached to the steer wheel 7 to be examined and adjusted until either parallel to or coincidental with the axis of rotation of steer wheel 7. The apparatus embodying the present invention 10 comprises a hanger means 6 adapted to hook over and be at least partially rotatably connected to directionally adjustable mounting shaft 4, a transverse suspension member 5 having a counterweight 8 at one end and a non-adjustable mounting shaft 12 at the other end rigidly connected to the hanger means, and a laser light source 13 retained in light source bracket 9, the bracket being mounted on and rotatable about non-adjustable mounting shaft 12. In use, transverse member 5 is adjusted to be in a substantially horizontal position after the apparatus is connected to the directionally adjustable mounting shaft 4. This causes rotation of hanger means with respect to shaft 4 and which is a source of calibration problems in the prior art. The light source bracket 9 is also rotated on the mounting shaft 12 in order to project light onto a datum 30.

Figure 2:
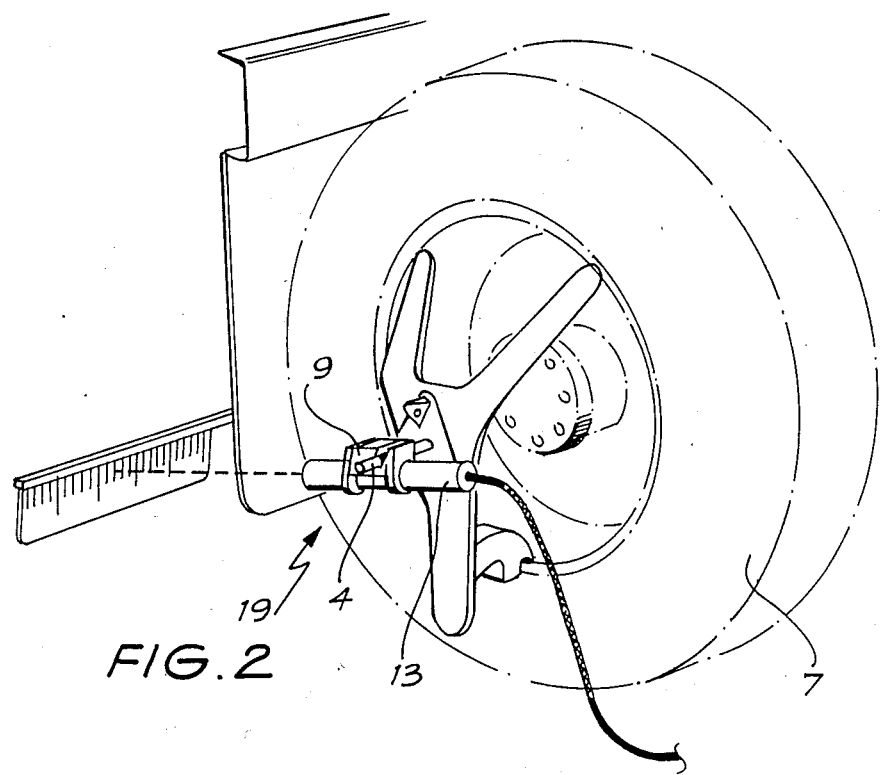
FIG. 2 is a diagrammatic perspective view illustrating an embodiment of the present invention as used to investigate the alignment of non-steer wheels.

FIG. 2 shows a second preferred embodiment 19 that is used to investigate the alignment of non steer wheels of a vehicle. A laser light source 13, retained in a bracket 9 is rotatably mounted on a directionally adjustable mounting shaft 4 which has been adjusted to be parallel to or coincidental with the axle of the wheel 7 under examination.

Figure 3:
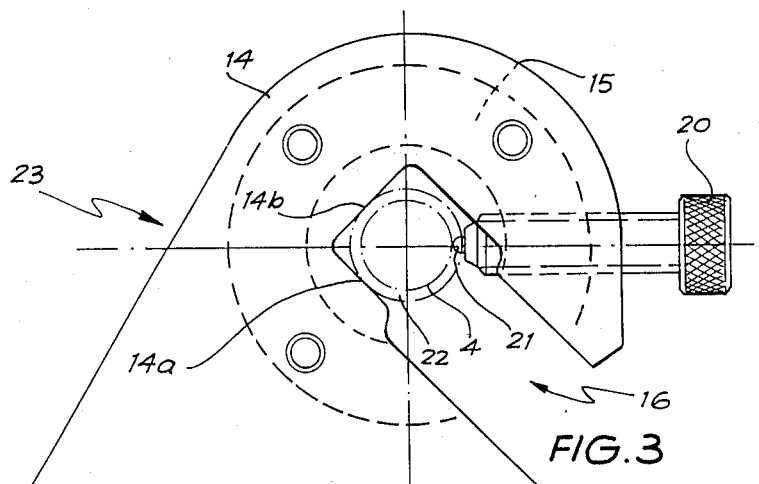
FIG. 3 is an enlarged elevational view of a detail of the hanger of the embodiment of FIG. 1.

FIG. 3 shows an elevation of the connection means between the hanger 6 and the directionally adjustable shaft 4 of FIG. 1. The top half of hanger 6 constitutes a mounting unit 23 which includes two side plates 14 separated by a curved transverse plate 15. A clamping means 20 is threadingly engaged in transverse plate 15, the clamping means including a spring loaded ball 21 in one end. The recesses 16 are disposed in such a way that a mounting shaft can be clamped in a triangulated manner between clamping means 20 and two points 14a and 14b on each of side plates 14 within recesses 16.

Figure 6:
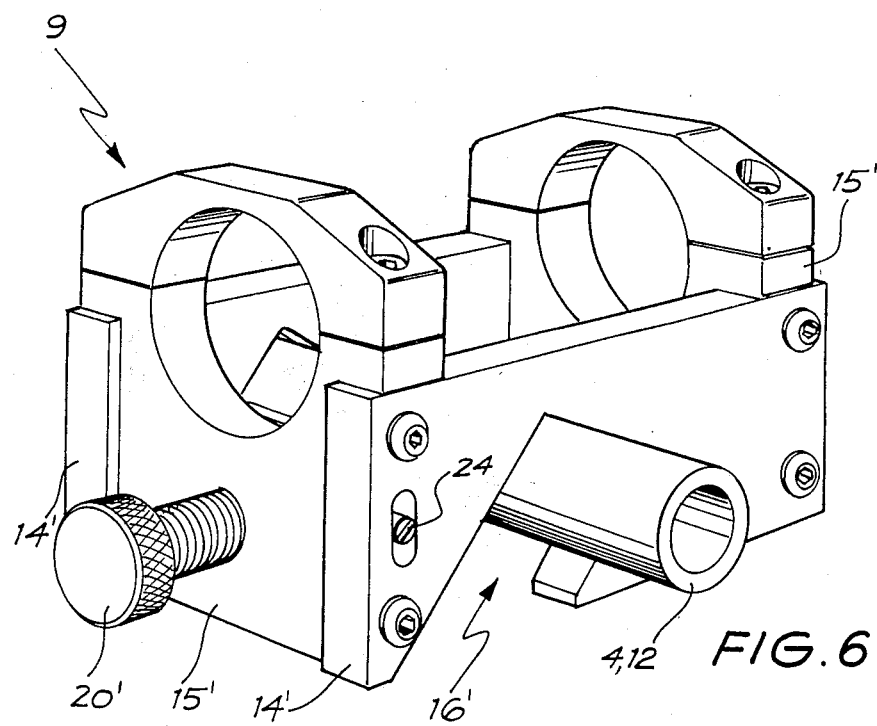
FIG. 6 shows a perspective view of the light source bracket depicted in FIG. 4 and FIG. 5.
Figure 4:
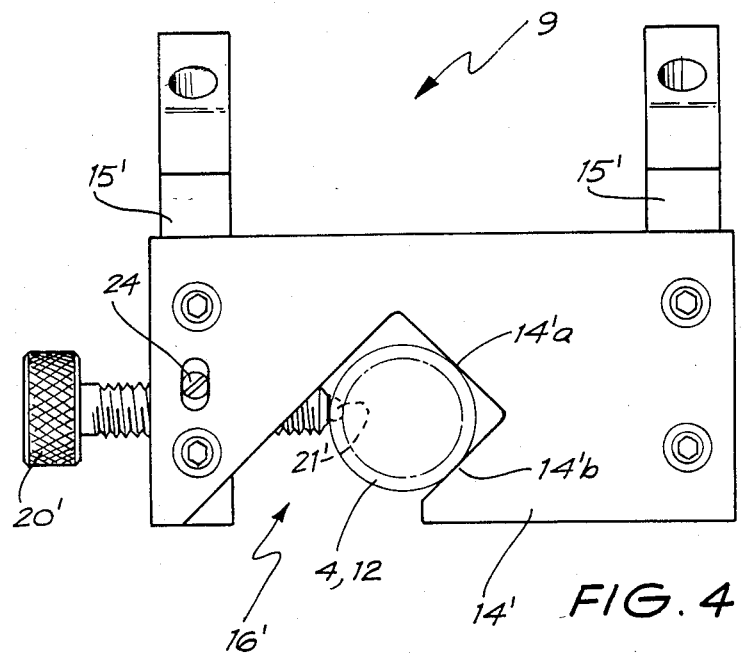
FIG. 4 is a side elevational view of the light source bracket which is common to FIG. 1 and FIG. 2, the actual light source being omitted for clarity.
Figure 5:
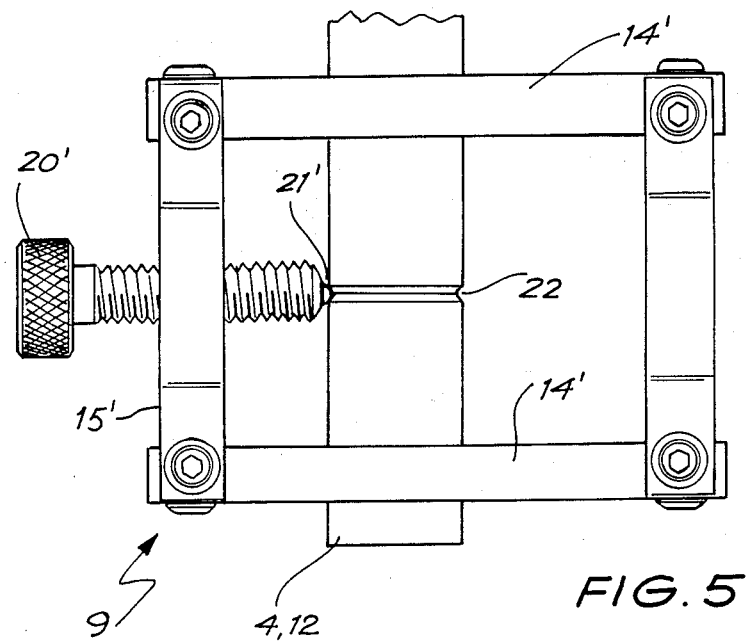
FIG. 5 is a top plan view of the light source bracket of FIG. 4.

FIGS. 4, 5 and 6 illustrate the connection means between the light source bracket 9 and the non-adjustable shaft 12 of FIG. 1 as well as the connection means between the light source bracket 9 and the directionally adjustable shaft 4 of FIG. 2. The laser light source 13 has been omitted for clarity. The bracket 9 in this instance corresponds to the mounting unit 23 of FIG. 3 in that the bracket 9 uses the same inventive principle to attach to a mounting shaft.

Two parallel side plates 14' of the light source bracket 9 are separated by two transverse plates 15', the side plates each having recesses 16'. A clamping means 20' having a spring loaded ball 21' at one end is threadingly engaged in one of the transverse plates 15'. The recesses 16 are disposed in such a way that a mounting shaft can be clamped in a triangulated manner between clamping means 20' and two points 14'a and 14'b on each of side plates 14' within recesses 16'. A calibration means 24 on the side of the bracket allows minor variation of the geometry of the bracket thus enabling slight changes to the direction of projection of a beam of light with respect to a mounting shaft. Thus the apparatus can be calibrated to ensure light is projected precisely as required. In the embodiment of FIG. 2 the bracket 9 is rotated through approximately 180° when in use. Movements of the light source bracket with respect to the mounting shaft 4 other than the required rotation caused the requirement for occasional recalibration of the prior art devices when in use.

In all of the above embodiments connection means are operated as follows:

A mounting unit 23 or 9 is hooked over a mounting shaft 4 or 12 depending on the embodiment, the shaft having a circumferential groove 22 therein. Clamping means 20, 20' threadingly engaged in transverse plate 15, 15' is rotated such that the end of clamping means 20, 20' containing spring loaded ball 21, 21' engages the circumferential groove 22. Continued rotation of the clamping means forces the mounting shaft 4 or 12 within recesses 16, 16' towards side plates 14, 14'. Finally the mounting shaft is clamped between clamping means 20, 20' and two points 14a, 14'a and 14b, 14'b on each of the side plates 14, 14'.

Such a connection means prevents rotation of a mounting unit about a mounting shaft by the action of friction between the mounting shaft and side plates. Furthermore, the mounting shaft is effectively triangulate at each end between the horizontal clamping means 20, 20' and two points on each side plate. Thus, any rotation of the mounting unit involving relative movement of opposite side plates 14, 14' is securely prevented. As precisely the same points on side plates 14, 14' are contacted for any given size of mounting shaft, the mounting unit and mounting shaft will always be in the same orientation each time the connection means is engaged. Thus the need to calibrate these embodiments at each installation is minimized.

When clamped in this way rotation about the mounting shaft is prevented up to a point due to friction between the contact points of the mounting shaft and side plates; however, by applying a torque larger than that normally encountered when the apparatus is in use, the mounting unit can be rotated relative to said shaft to a new position without releasing said clamping means.

During such a rotation no lateral movement occurs as the spring loaded ball is engaged in the circumferential groove 22 of the mounting shaft. Thus, wheel alignment apparatus embodying the present invention can be attached to a mounting shaft with no relative movement other than axial rotation, and no loosening of the clamping means occurs if the mounting unit is rotated relative to the mounting shaft during use so that the need to recalibrate during use is minimised.

I claim:

1. A wheel or axle alignment apparatus comprising:
   a directionally adjustable mounting shaft adapted to be mounted parallel to the axis of rotation of a wheel of a vehicle;
   hanger means adapted to hook over said directionally adjustable mounting shaft comprising a bottom, two spaced parallel side plates, at least one transverse separating member between said side plates for separating said side plates, identical recesses in each of said side plates adapted for receiving said directionally adjustable mounting shaft therein, a pair of contact points on each of said side plates within each recess thereof engageable with said directionally adjustable mounting shaft, and clamping means adapted to contact said directionally adjustable mounting shaft at right angles and to clamp said directionally adjustable mounting shaft in a triangulated manner between said clamping means and said pairs of contact points;
   a transverse suspension member rigidly connected to said bottom of said hanger means and having ends thereon;
   a non-adjustable mounting shaft at one end of said transverse suspension member; and
   a light source retaining bracket comprising two spaced parallel side plates, at least one transverse separating member between said bracket side plates for separating said bracket side plates, identical recesses in each of said bracket side plates adapted for receiving said non-adjustable mounting shaft therein, a pair of contact points on each of said bracket side plates within each recess thereof engageable with said non-adjustable mounting shaft, and bracket clamping means adapted to contact said non-adjustable mounting shaft at right angles to clamp said non-adjustable mounting shaft in a triangulated manner between said clamping means on said bracket and said pairs of contact points on said bracket so that said bracket is at least partially rotatable on said non-adjustable mounting shaft, and a light source retaining means on said bracket so that a beam of light from a light source retained by said retaining means is projectable at approximately right angles with respect to said transverse suspension member.

2. A wheel or axle alignment apparatus comprising:
   a directionally adjustable mounting shaft adapted to be mounted parallel to the axis of rotation of a wheel of a vehicle;
   a light source retaining bracket adapted to be rotatably mountable on said directionally adjustable mounting shaft comprising two spaced parallel side plates, at least one transverse separating member between said side plates for separating said side plates, identical recesses in each of said side plates adapted for receiving said directionally adjustable mounting shaft therein, a pair of contact points on each of said side plates within each recess thereof engageable with said directionally adjustable mounting shaft, and clamping means adapted to contact said directionally adjustable mounting shaft at right angles and to clamp said directionally adjustable mounting shaft in a triangulated manner between said clamping means and said pairs of contact points, and
   a light source retaining means on said bracket so that a beam of light from a light source retained by said retaining means is projectable at approximately right angles with respect to said shaft.

3. A wheel alignment apparatus as claimed in claim 1 wherein; at least one of said hangar means and said light source bracket further comprises calibration means adapted to allow relative adjustment of the respective side plates.

4. A wheel or axle alignment apparatus as claimed in claim 1 wherein: a circumferential groove is provided in at least one of said mounting shafts and the respective clamping means has an end which engages said circumferential groove in the respective mounting shaft.

5. A wheel or axle alignment apparatus as claimed in claim 4 a, respective wherein each of said clamping means is threadedly engaged in a respective transverse separating member.

6. A wheel or axle alignment apparatus is claimed in claim 4 wherein: a spring loaded ball is mounted in the end of the clamping means that contacts the respective mounting shaft.

7. A wheel or axle alignment apparatus as claimed in claim 1 wherein: said recesses in said side plates comprise substantially rectangular ended slots.

8. A wheel alignment apparatus as claimed in claim 2 wherein: said light source bracket further comprises calibration means adapted to allow adjustment of the orientation of said light source.

9. A wheel or axle alignment apparatus as claimed in claim 8 wherein:
   a circumferential groove is provided in said shaft, and said clamping means has an end which engages said circumferential groove.

10. A wheel or axle alignment apparatus as claimed in claim 9 wherein: said clamping means is threadedly engaged in said transverse separating member.

11. A wheel or axle alignment apparatus as claimed in claim 10 wherein: a spring loaded ball is mounted in the end of said clamping means that contacts said shaft.

12. A wheel or axle alignment apparatus as claimed in claim 11 wherein: said recesses in said side plates comprise rectangular ended slots.

* * * * *